Figure 1:
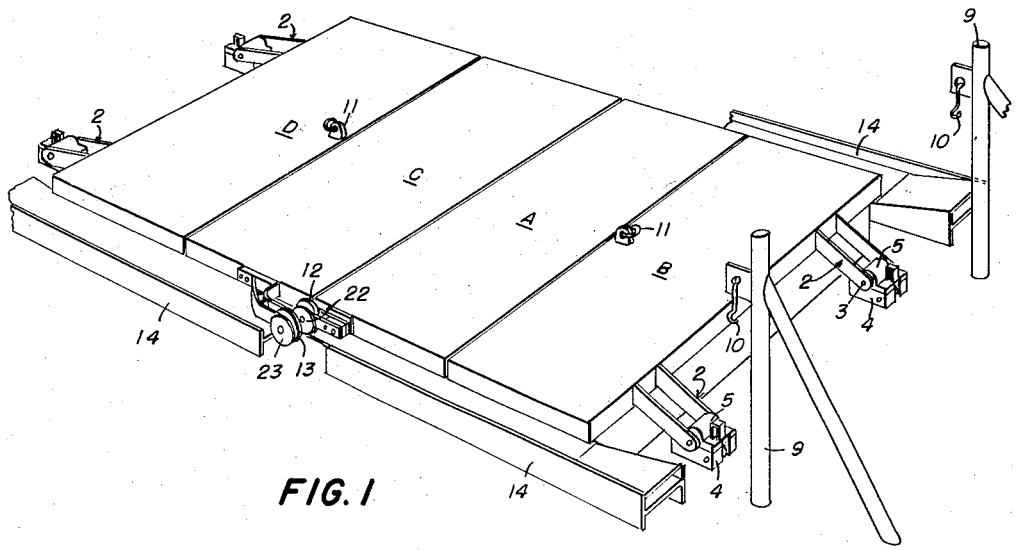

Jan. 20, 1959 G. STRANSKY 2,869,501
WATER-TIGHT HATCH COVER
Filed Feb. 12, 1953 9 Sheets-Sheet 1

INVENTOR
GUSTAVE STRANSKY

ATTORNEYS

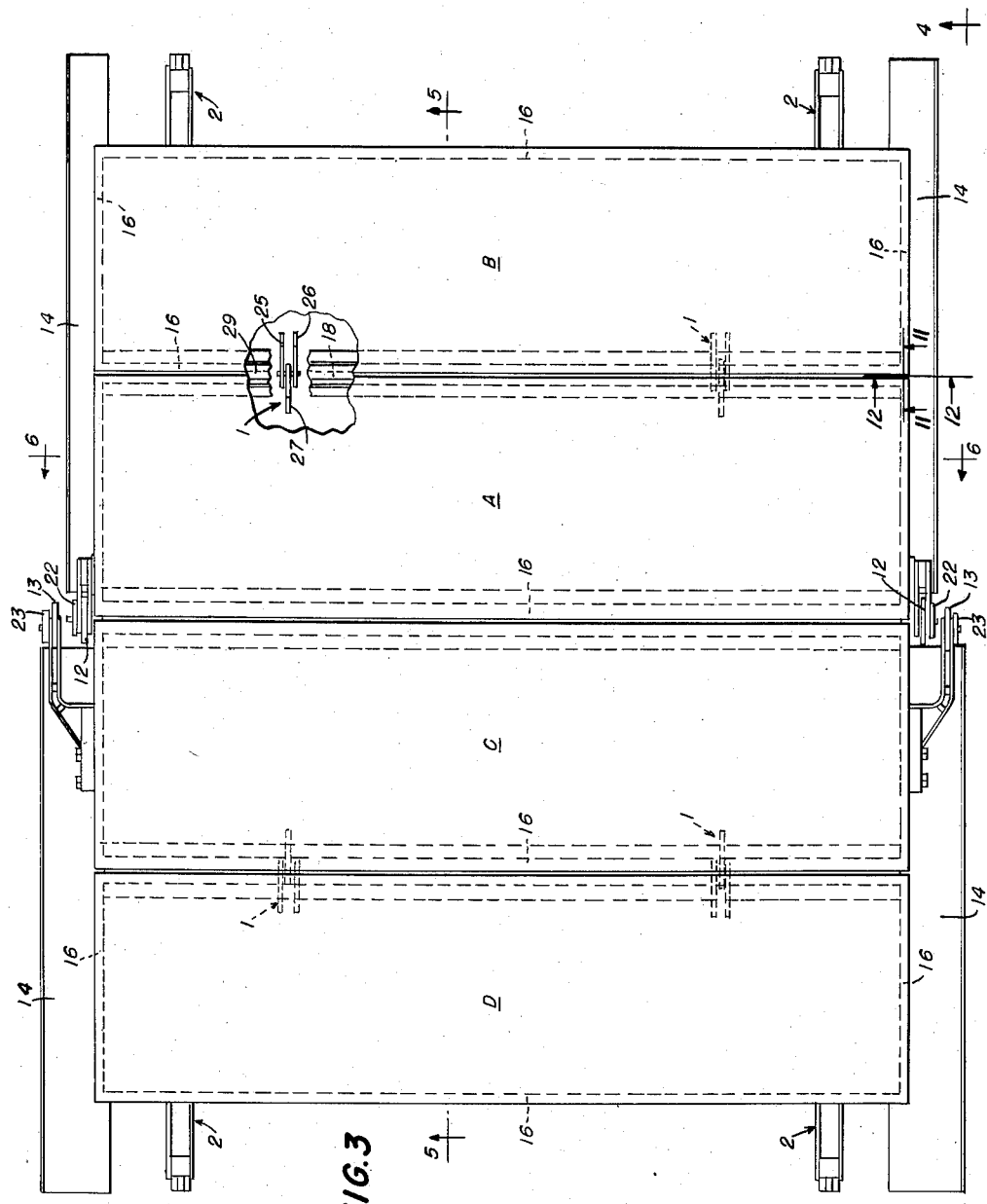

Jan. 20, 1959  G. STRANSKY  2,869,501
WATER-TIGHT HATCH COVER
Filed Feb. 12, 1953  9 Sheets-Sheet 3
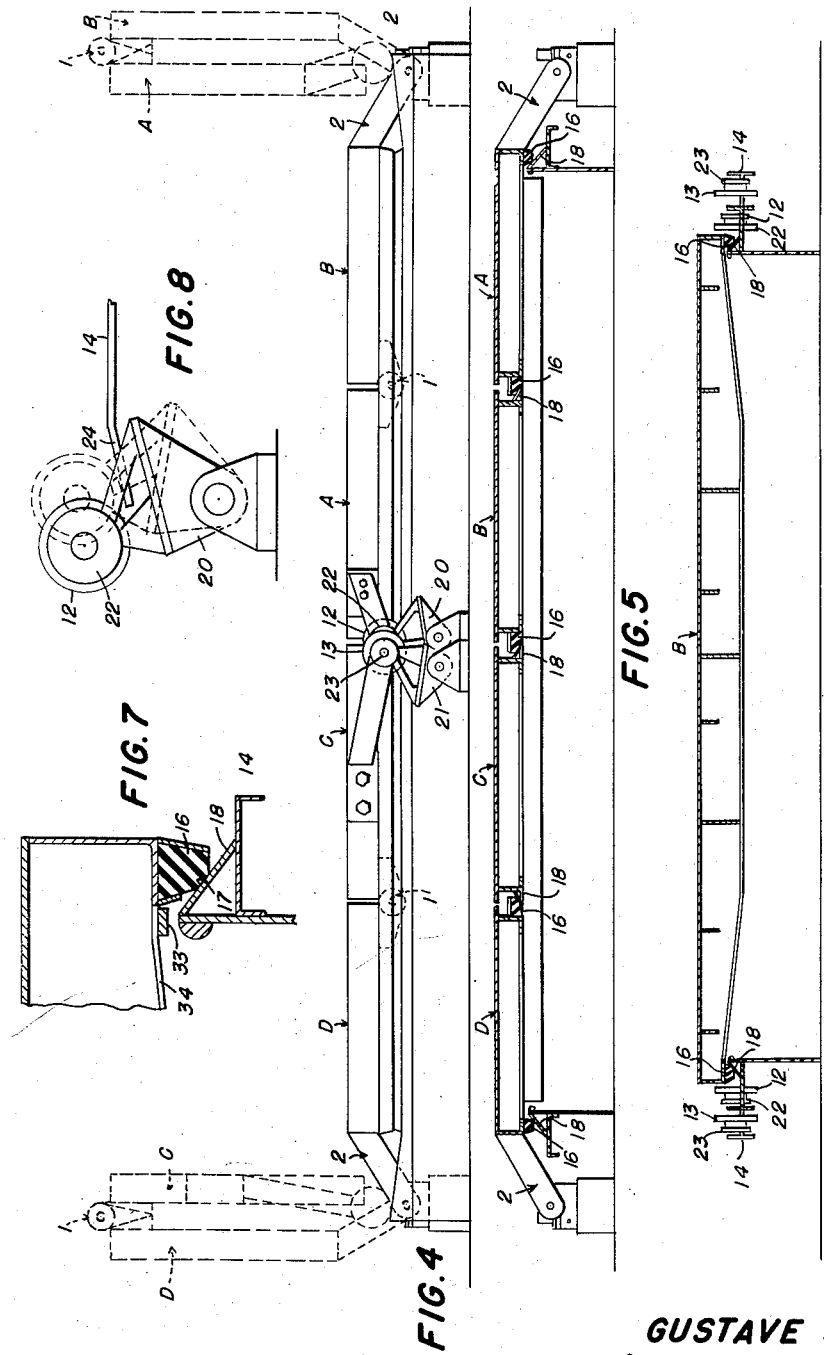
INVENTOR
GUSTAVE STRANSKY
ATTORNEYS Jan. 20, 1959   G. STRANSKY   2,869,501
WATER-TIGHT HATCH COVER
Filed Feb. 12, 1953   9 Sheets-Sheet 4
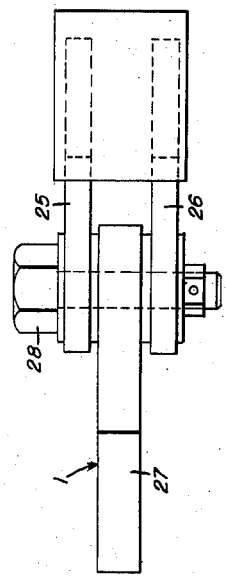
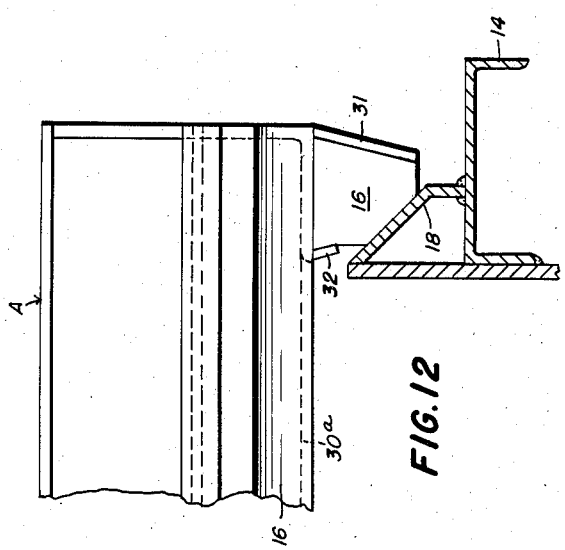
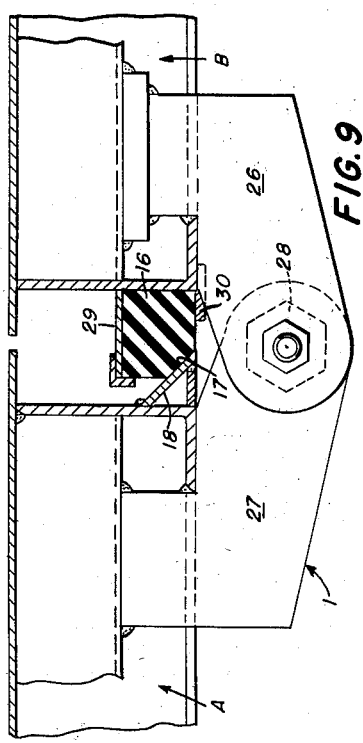
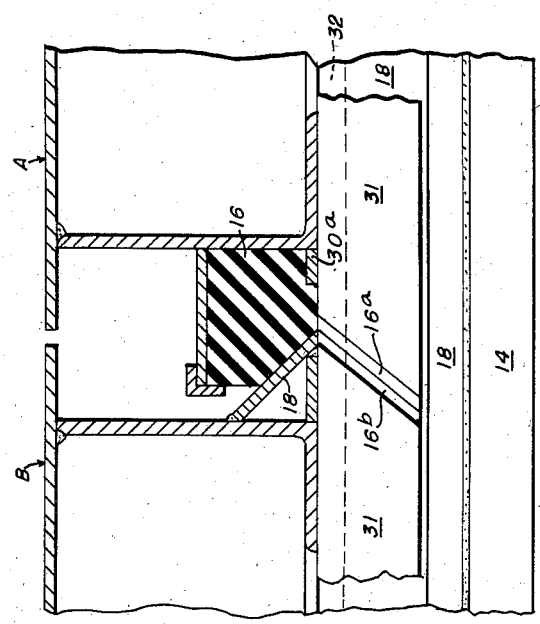
INVENTOR
GUSTAVE STRANSKY
ATTORNEYS Jan. 20, 1959

G. STRANSKY 2,869,501

WATER-TIGHT HATCH COVER

Filed Feb. 12, 1953

9 Sheets-Sheet 5

INVENTOR
GUSTAVE STRANSKY

BY

ATTORNEYS

Jan. 20, 1959 — G. STRANSKY — 2,869,501
WATER-TIGHT HATCH COVER
Filed Feb. 12, 1953 — 9 Sheets-Sheet 6
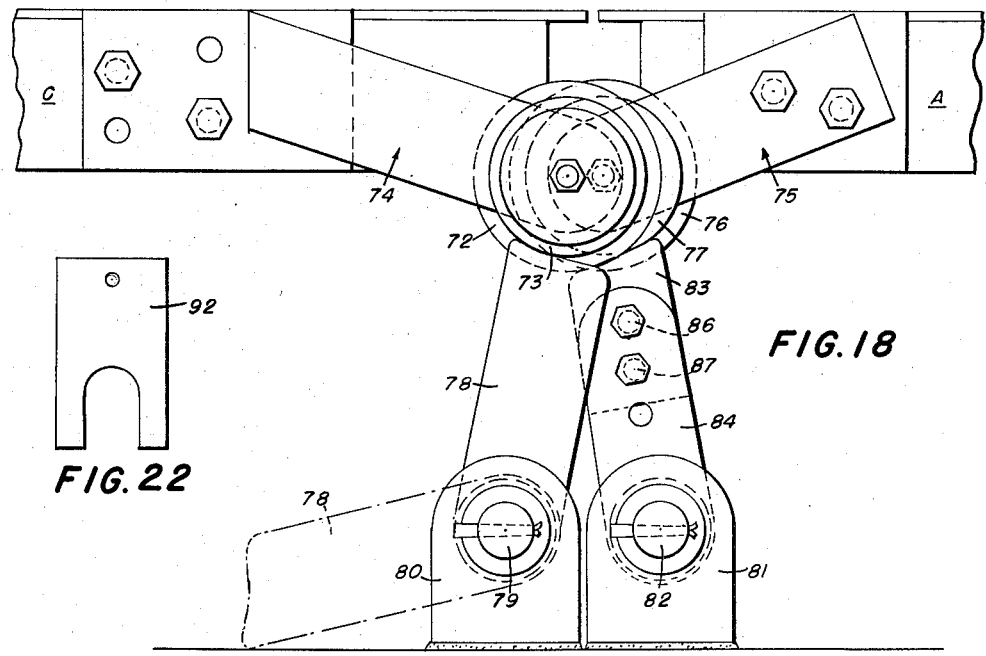
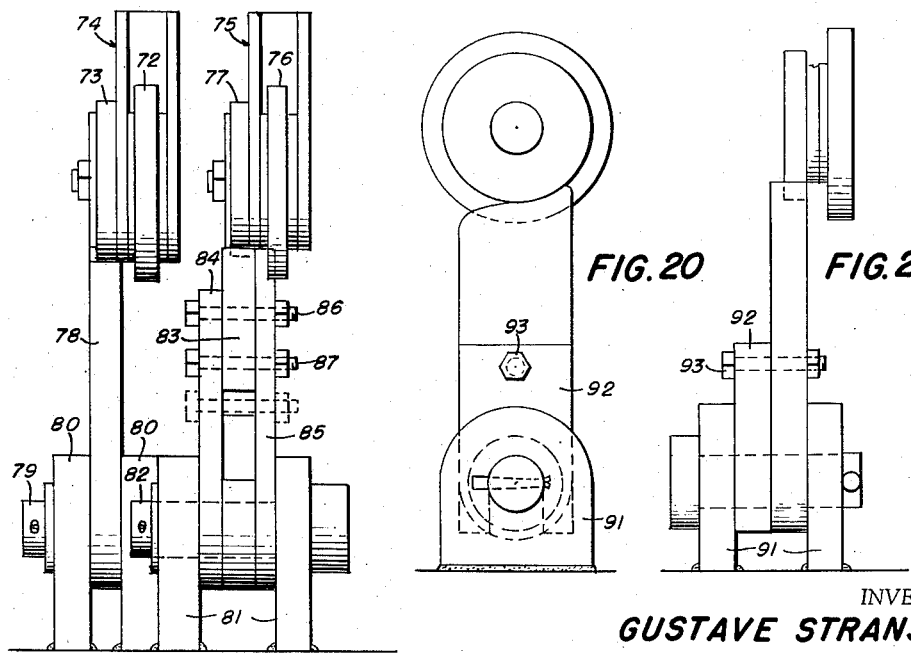
INVENTOR
GUSTAVE STRANSKY
ATTORNEYS Jan. 20, 1959  G. STRANSKY  2,869,501
WATER-TIGHT HATCH COVER
Filed Feb. 12, 1953  9 Sheets-Sheet 7

INVENTOR
GUSTAVE STRANSKY
BY
ATTORNEYS

Jan. 20, 1959     G. STRANSKY     2,869,501
WATER-TIGHT HATCH COVER

Filed Feb. 12, 1953     9 Sheets-Sheet 8

INVENTOR
GUSTAVE STRANSKY

BY *[signature]*
ATTORNEYS

Jan. 20, 1959  G. STRANSKY  2,869,501
WATER-TIGHT HATCH COVER
Filed Feb. 12, 1953  9 Sheets-Sheet 9

INVENTOR
GUSTAVE STRANSKY
BY
ATTORNEYS

United States Patent Office 2,869,501
Patented Jan. 20, 1959

2,869,501

WATER-TIGHT HATCH COVER

Gustave Stransky, New York, N. Y.

Application February 12, 1953, Serial No. 336,502

22 Claims. (Cl. 114—202)

The present invention relates to the art of ship building. More particularly this invention relates to a hatch cover.

Specifically the invention relates to a Water-Tight Hatch Cover and incorporates, in combination with a multiple section hatch cover, a structurally unique and long lasting gasketing arrangement that insures an adequate sealing relationship between the sections of the hatch cover and the coaming and between the respective hatch cover sections.

It is therefore a specific object of this invention to provide in conjunction with hatch covers of multiple sections, a sealing arrangement incorporating sealing strips at the periphery of the hatch cover sections and between the respective sections and the immediately subjacent peripheral coaming sections.

It is a still more specific object to provide a sealing arrangement incorporating cooperating beveled surfaces on the coaming structure and the cover section or sections.

It is an additional object to provide in conjunction with a hatch cover of the folding type, means cooperatively associated between at least one cover section of a group of sections and the adjacent cover supporting surfaces automatically operable responsive to the iniation of a cover opening movement to impart to the cover sections a component of vertical movement sufficient to disrupt the sealing relationship between the gasket strip carried by the cover sections and the underlying cooperating strip embodied on the coaming.

It is a further specific object to provide in conjunction with a peripheral gasket of bevel shaped configuration, a cooperating rigid beveled seal strip carried by the coaming and a peripheral depending strengthening rib carried by the cover sections to insure that the total weight of the cover sections is not borne by the cooperative engagement of the sealing strip of the cover with the sealing strip on the coaming.

It is therefore a specific object to provide a unique cooperative combination and sealing engagement between a resilient gasket strip of material such as rubber or a synthetic rubber, such as neoprene, and a rigid cooperative strip carried at the periphery of the coaming and embodying a beveled or angled mutually contacting surface relationship permitting a self-aligning closure of the cover sections in absolute water-tight sealing relationship.

It is a further specific object to provide a rigid sealing strip structure carried by the periphery of the coaming subjacent the upper edge thereof that does not require any draining in relation to the hatch cover between sealing bar or strip and coaming.

It is a further object to provide in conjunction with hatch covers, particularly of the folding type, a unique pivot seat arrangement at the ends of the hatches to permit complete disassociation of the hatch cover sections from the hatch.

Further and more specific objects will be apparent from the following description taken in connection with the accompanying drawings illustrating the various phases of the invention as applied to two types of folding hatch covers.

While this invention is illustrated in conjunction with folding hatch covers, it must be borne in mind that the important and salient features of the peripheral sealing relationship between the respective cover sections and the periphery of the hatch coaming are not to be limited to utilization with folding type hatch covers since the sealing relationship is ideally suited for use in conjunction with sliding or rolling type hatch covers, therefore the accompanying drawings are illustrative of the invention.

Figure 2:
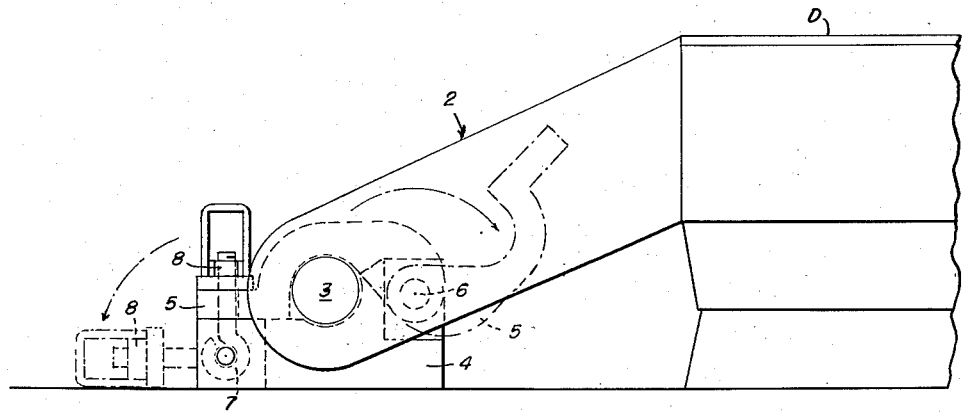
Figure 13:
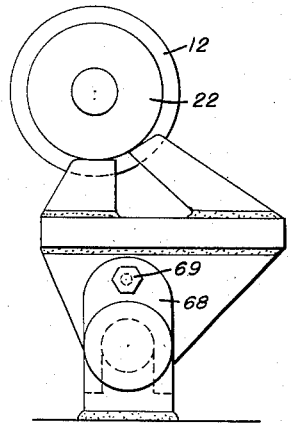
Figure 16:
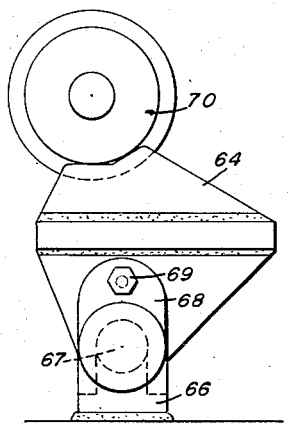
Figure 15:
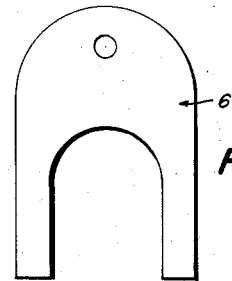
Figure 17:
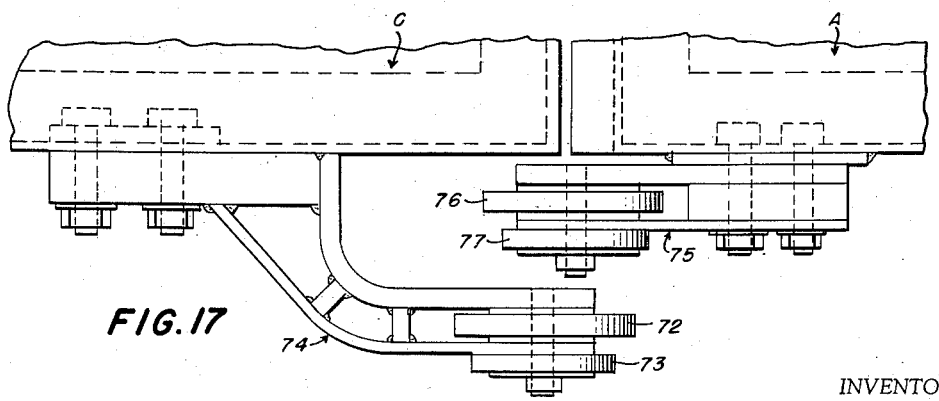
Figure 23:
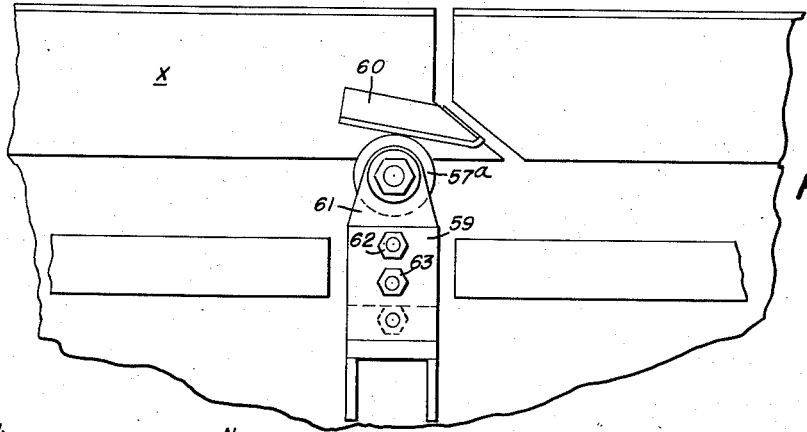
Figure 24:
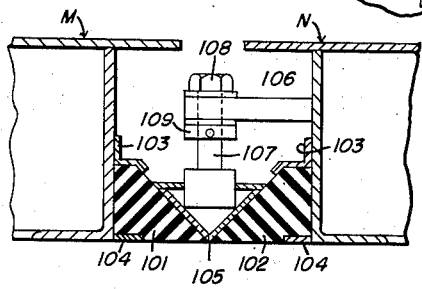
Figure 25:
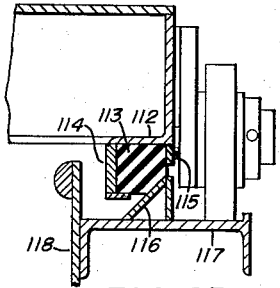
Figure 26:
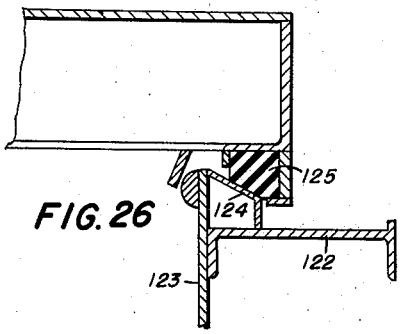
Figure 27:
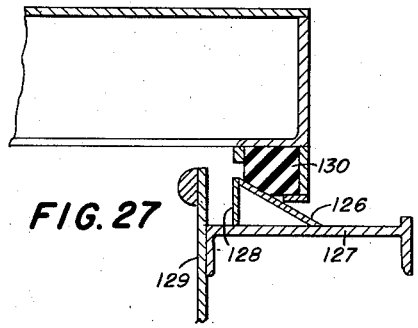
Figure 28:
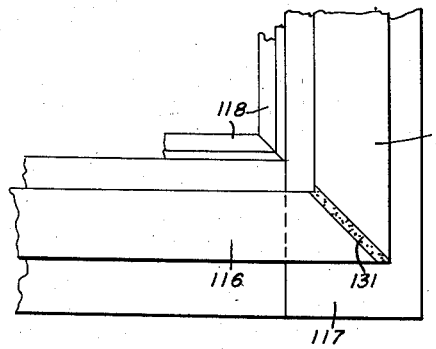
Figure 30:
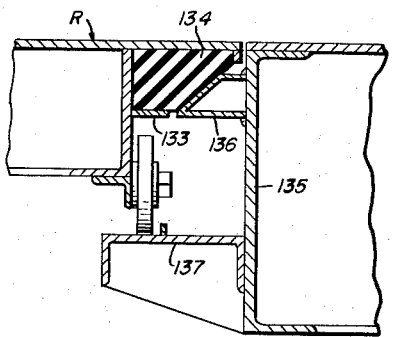
Figure 31:
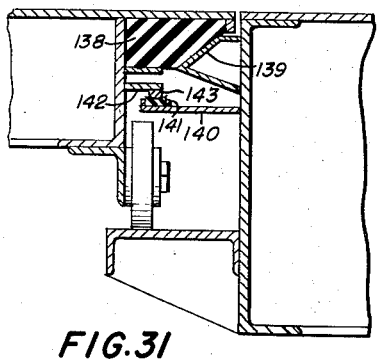
Figure 32:
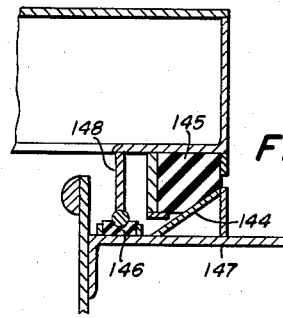
Figure 33:
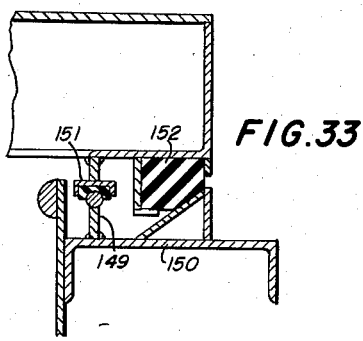
Figure 34:
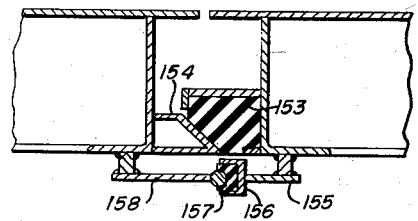
Figure 38:
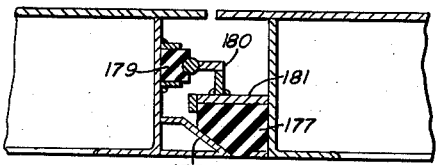
Figure 37:
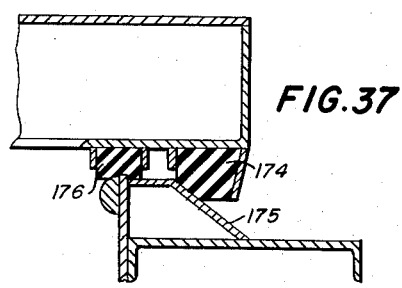
Figure 35:
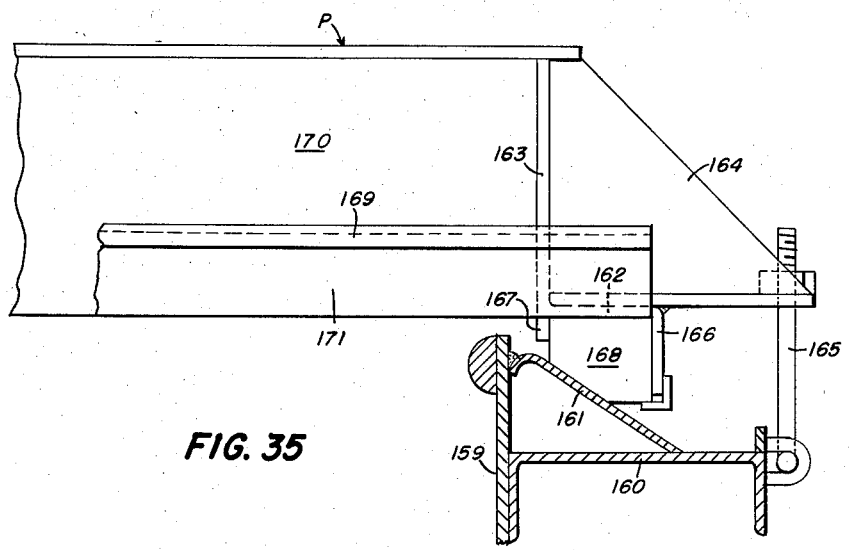
Figure 36:
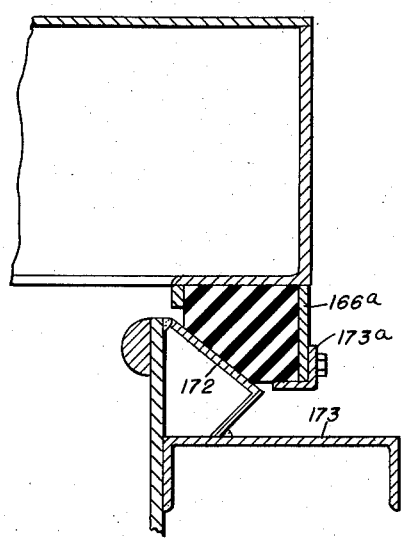
Figure 39:
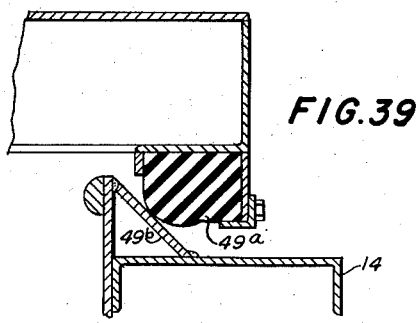

Figure 1 is a diagrammatic perspective view of a hatch cover arrangement in closed relationship and embodying two groups of paired folding cover sections, Figure 2 is a view illustrating one of the safety pivot seats at the ends of the hatch cover, Figure 3 is a top plan view of a four-section folding hatch cover in closed position, Figure 4 is a side elevational view of the arrangement shown in Figure 3, Figure 5 is a longitudinal cross-sectional view taken on the line 5—5 of Figure 3, Figure 6 is a transverse cross-sectional view taken on the line 6—6 of Figure 3, Figure 7 is a fragmentary cross-sectional view on a larger scale of a detail embodied in Figure 6, Figure 8 is a view on a larger scale illustrating a detail embodied in Figure 4, Figures 9 and 10 are respective diagrammatic sectional and top plan views of the hinge structure connecting the cover sections of each pair illustrated in Figure 3, Figure 11 is a cross sectional view on an enlarged scale taken on line 11—11 of Figure 3, Figure 12 is a cross sectional view on an enlarged scale taken on line 12—12 of Figure 3, Figures 13 to 15 illustrate details of the lever device carried by the deck for cooperating with the roller for lifting the same to break the horizontal seal with particular reference to the lateral displacement of the lever to permit adequate dogging of the hatch cover, Figure 16 is a modification of the arrangement shown in Figure 13, Figure 17 is a top plan view on an enlarged scale of the cover wheels similar to that in the arrangement of Figures 3 and 4, Figure 18 is a side elevational fragmentary view illustrating adjacent cover sections of the type embodied in Figures 3 and 4 with particular reference to the lever means for imparting a vertical lift force to the cover sections, Figure 19 is a fragmentary elevational view looking from the right of Figure 18, Figure 20 is a modification of the lifting lever illustrated in Figure 18, Figure 21 is a front elevational view of the arrangement of Figure 20 as viewed from the right, Figure 22 is a view of a component part of the structure disclosed in Figures 20 and 21, Figure 23 is a fragmentary view partly in section and partly in elevation of a modified form of cover lifting means, Figure 24 is a similar cross sectional view of a modified form of sealing arrangement provided between the adjacent cover sections of groups of sections of the type embodied in the form of the invention shown in Figures 3 and 4, Figure 25 is a cross sectional view illustrating a modified form of peripheral sealing arrangement, Figures 26 and 27 are cross sectional views illustrating modifications of peripheral sealing relations, Figure 28 is a fragmentary plan view illustrating the corner joint of the rigid sealing strip embodied on the coaming with particular reference to the sealing arrangement illustrated in Figure 25, Figure 2 is a similar view of corner joint with particular reference to the sealing arrangement illustrated in Figure 26, Figure 30 is a fragmentary cross sectional view illustrating a peripheral seal of a flush watertight hatch cover, Figure 31 is a similar view with reference to a flush water-tight hatch cover utilized for a refrigerated hold, Figures 32 and 33 are alternative forms illustrating the peripheral sealing relationship for refrigerated holds with particular reference to the basic sealing relationship shown in Figure 25, Figure 34 is a cross sectional view of the joint between adjacent sections of the groups of sections with paritcular reference to a seal for a refrigerated hold, Figure 35 is a fragmentary view partly in section and partly in elevation illustrating the peripheral seal and the transverse seal in a modified form of cover structure, Figure 36 is a cross sectional view of a modified form of a peripheral sealing arrangement between a cover section and the coaming, Figure 37 is a modification of the peripheral seal shown in Figure 7 and illustrating a double seal, Figure 38 discloses a further modification of a double seal between adjacent cover sections, and Figure 39 discloses a modification in which the face of the gasket strip is initially of arcuate form.

The invention will now be particularly described with initial reference to a hatch cover arrangement of the folding type embodying four cover sections arranged in pairs with the pairs folding away from one another in opposite directions and moving either athwartship or fore and aft depending upon the particular ship construction and the function of the particular hold with which the covers are associated. As shown in Figure 1, cover sections A and B are hinged to one another by a hinge joint denoted 1 of the type illustrated in Figures 3, 9 and 10. Cover sections C and D are similarly hingedly interconnected. Thus cover sections B and D are the end sections and each of these end sections carry in the example illustrated, a pair of pivot arms 2. Obviously more than two arms can be utilized in conjunction with each end section. Each pivot arm is associated with a removable safety pivot seat of the type particularly illustrated in Figure 2. The pivot seat includes spaced arms at the lower end of which is mounted a transversely extending pin 3. The safety pivot seat further includes a base block member 4 that is fixed to the deck and constitutes a bearing half. A swinging block member 5 is pivoted to the bearing half 4 on the pintle 6 and constitutes a complementary bearing half portion. The swinging block member 5 is bifurcated at its end to accommodate a swinging latching bolt connection including the bolt 7 and nut 8. As shown in Figure 2 the opening provided between the complementary bearing block members 4 and 5 is larger than the diameter of the pin 3 to permit play in the hinge joint afforded between the connection of the pairs of arms 2 and the safety pivot block and to insure proper unfolding of the cover sections. It is believed clear from the drawing that the cover sections can be disassociated completely from the hatch by suitable manipulation of block 5 into the dotted line position shown in Figure 2 which exposes the pin 3 in its pivot seat and permits the simple elevation of the hatch cover sections A and B or C and D from the pivot bearing blocks on the deck. It is to be understood of course that conventional type hinge connections may be utilized for securing the cover sections in pivoted relationship with respect to the deck although I prefer to employ the removable connection as embodied in the drawings.

Figure 1 further illustrates supporting posts 9 having hooks 10 thereon for latching engagement with eyes 11, Figure 4, on cover sections B when they are raised to the position shown in Figure 4. Obviously similar pairs of posts 9 are arranged at the opposite end of the hatch. The hatch cover pairs A, B and C, D carry supporting rollers 12 and 13, the details of which and the operation of which will be more fully described hereinafter. These rollers ride on trackways 14 extending along the opposite edges of the coaming. As conventional, this trackway is provided by a profile iron being welded to the vertical wall of the coaming.

Figure 4 illustrates in a little more detail the appearance of the hatch cover of the type shown in Figure 1 when in closed position and as viewed from the side thereof. At the right hand end of this figure the view is broken away to disclose the peripheral seal relationship at one end of the hatch. Obviously the seal is similar but of exactly reverse structure at the opposite end of the hatch. The details of the sealing relationship will be described more fully hereinafter. The cable or line 15 from a suitable winch or lifting mechanism embodied with the ship's superstructure is affixed to the eye 11 which is provided on each of the cover elements B and D and the lift force is exerted thereon so that cover sections A and B hinge or fold about hinges 1 and on continued application of force they fold about the axis provided by the pin 3 to assume the upright dotted line position shown in Figure 4 at which point they are latched in upright position by the hooks 10. It is well known that in conjunction with water-tight hatch covers the sealing arrangement must be such as to be absolutely water-tight with particular reference to the peripheral seal. Additionally it is important that the seal between cover sections of pairs of cover sections such as the seal provided between cover sections A and B superjacent the axis of pivotation provided by the group of hinges 1 be of such effectiveness and strength as to insure an absolutely water-tight seal transversely of the hatch opening.

Bearing in mind that hatch covers are conventionally made of steel or other metal and have substantial weight, it is a known factor that horizontally arranged sealing strips of rubber when cooperating with a vertical metal sealing bar take a permanent set and minimize the adequacy of the seal so that the hatch covers actually leak. Additionally warpage factors must be considered and where horizontally disposed seal surfaces are solely provided there is the possibility that at either the end or the side periphery seals, warpage of the metal can disrupt the alignment between the sealing strip of rubber carried by the cover sections and the metal sealing bar carried by the hatch coaming. Thus consistent with the objects of the present invention I have provided a unique sealing arrangement which in effect constitutes a periphery seal between cover sections and a periphery seal about the entire hatch coaming.

Figures 3, 5 and 6 illustrate the various seals. The seals include gasket strips 16 which may be of rubber or of a synthetic rubber such as neoprene. The strips 16 cooperate with metallic sealing bars 18. From Figure 3 it is clear that cover sections A and D have a gasket strip 16 around the four sides thereof. Cover section B has a gasket strip 16 along the small ends and the long side adjacent cover section C. Cover section C has a gasket strip 16 extending along the narrow sides and a metallic sealing bar extending along its two long sides. This arrangement is shown in Figure 5 as regards the transverse seal between the cover sections of each bar and the transverse seal between the adjacent cover sections B and C. The sealing bars 18 extending across the ends of the hatch coaming and also along the sides of the coaming as shown in Figure 6. One of the essential requisites of my invention is the fact that this seal strip is provided with a beveled or angled sealing surface 17 for cooperation with the angled metallic sealing strip 18 carried on the vertical wall of the coaming and supported by a profile iron 19 at the ends of the hatch and the roller track 14 along the sides of the hatch. This particular arrangement is illustrated on a larger scale in Figure 7.

While I have illustrated the angled seal strip 18 as being weld in position between a profile iron extending horizontally outward of the vertical wall of the coaming and the upper edge of the coaming, it is within the framework of the present invention to provide an arrangement in which the angled strips 18 does not have to be supported by a profile iron or some other horizontally projecting element but can consist of a V-shaped element welded along its edges to the side of the coaming with the apex of the V displaced laterally outwardly thereof so that the angled surface can cooperate with the angled sealing strip.

In connection with the opening of hatch covers of the type illustrated in Figures 1 to 7, it is important and essential that the horizontal seal between the resilient seal strip and the metal seal bar be disrupted prior to lifting the hatch covers. It is further essential that means be provided to disrupt this seal so as to minimize frictional wear on the resilient seal strip. Conventionally, hatch covers utilize either eccentric pintles for the cover supporting rollers such as 12 and 13 or jacking mechanisms which impart a vertical component of movement to the hatch cover prior to any attempt to pivot the same in their folding or opening movement. In order to eliminate the individual jacking or lifting of the cover sections by a crew member prior to any hatch opening movement I have provided, as diagrammatically illustrated in Figures 4 and 8 and as will be described in more detail hereinafter with reference to the modifications, automatically operable means embodied in part with cover sections A and C and embodied in part on the deck structure to effect an initial vertical movement of the hatch cover sections to disrupt the seal during the initial portion of the lifting pull exerted by the line or cable 15. This means includes swingable lever means 20 and 21 respectively associated with each of the cover section supporting rollers 12 and 13. As shown in Figure 3, the rollers 12 and 13 are double rollers and include a wheel or roller section of smaller diameter 22 and 23 respectively. These small roller sections 22 and 23 rest on the upper surfaces of the lever means or pivoted cam members 20, 21. The roller supporting track 14 extending along the side of the hatch opening are notched out to accommodate the lever members 20 and 21 and deformed to provide for each large diameter portion of rollers 12 and 13 a downwardly inclined track section 24. It is believed obvious that when the pull is exerted through line 15 the initial withdrawing movement of cover section A to the right in Figure 4 effects a swinging of lever 20 to the right toward the dotted line position shown in Figure 8 which raises the axis of roller 12 and rolls said roller up the inclined track section 24 until it has reached the horizontal plane of the roller supporting track 14. This swinging movement imparts a vertical lift to cover section A to break the horizontal seal between the gasket strip 16 extending along the side of cover A. Obviously as the pull is increased the seal is broken between the cover section B and the underlying metal seal strip. Of course a similar action applies when a line is affixed to a pad eye on cover section C to move the pair of sections C and D to the left. In that instance roller 13 cooperating with pivoted lever member 21 in a similar fashion. In connection with the pivoted lever members 20, 21 it should be borne in mind that they are utilized when the ship is in port until it is necessary to manipulate the hatch covers. When the ship proceeds to sea as customary, the hatch covers are dogged down by suitable dogging means of any conventional well-known type and thus means are provided to displace the pivoted levers 20 and 21 laterally of the rollers so that in the dogging operation the cover sections can be moved downwardly with sufficient force to provide the adequate seal. Various relationships and modifications of the pivoted lever members for insuring the breaking of the horizontal seal between the rubber gasket strip and the metal seal strip will be described hereinafter with particular reference to Figures 13 to 22.

Figures 9 and 10 illustrate on a larger scale the hinge connection 1 as particularly embodied between cover sections A and B. As indicated in Figure 3, plural hinges are embodied between these said cover sections and each hinge includes spaced hinge pads 25 and 26 carried by cover section B at the under side thereof and a hinge blade 27 carried by cover section A. The hinge pintle is comprised by a bolt 28 passing through alignable apertures in the hinge pads and the hinge blade. As shown in Figure 9, the sealing strip 16 is supported by a top plate element 29 welded to the front edge of section B and a bottom supporting strip element 30 which extends transverse to the hatch opening, underlies the gasket strip 16 and is notched out to accommodate the various pairs of hinge pads 25 and 26. The sealing strip 16 along its beveled edge 17 cooperates with the angled metal seal plate 18 extending along the adjacent end wall of the cover section A. Figure 11 is a section taken along line 11—11 of Figure 3 and between cover sections A and B at the juncture thereof with the periphery gasket strip extending along the side of the coaming. This figure shows seal strip sections 16ª and 16ᵇ secured to the under surface of the side of the adjacent edges of cover sections A and B. These strip sections are beveled or angled at their junction between the cover sections A and B and since cover section B starts to move first this beveled joint between strips 16ª and 16ᵇ will yield in the opening movement and will seal properly in the closing movement. Figure 12 illustrates the metal supporting plates 31 and 32 extending along the under surface of the side edges of the cover sections which are deflected inwardly toward one another to securely seat the periphery gasket strips 16ª or 16ᵇ along the said side edges. As illustrated in Figures 7 and 12, the metal seal strip 18 extends downwardly and outwardly from the upper marginal edge of the coaming so as to eliminate the necessity of any drain openings. Additionally since in all instances the sealing engagement between the gasket strips carried by the various cover sections and the metal seal bars or strips carried by the coaming is an angled or beveled engagement, my hatch covers in their closing perform what might be termed a self-aligning closing movement. The beveled engagement facilitating the adequate seating of the cover sections and also providing an enhanced sealing relationship.

As an important adjunct and as shown in Figure 7, a depending strengthening rib 33 is secured to the under surface of each transverse rib 34 extending transversely of the cover sections. Each cover section is provided with two or three of these transverse ribs which are usually of inverted T shape with the web of the T lowermost and these strengthening rib sections 33 depend from the web of each T at a position inwardly of the peripheral side edge of each cover section so that in closing the cover this rib 33 immediately overlies the top of the vertical wall of the hatch coaming. As shown in Figure 7 when the cover is initially seated there is a clearance between the upper surface of the hatch coaming and the under surface of the rib elements 33 so that when the cover is dogged down rib elements 33 engage the upper surface of the hatch coaming to support a substantial portion of the weight of the covers and to reduce the compressive force applied to the gasket so that the entire weight of the cover is not supported by the rubber gasket strips. This strengthening rib 33 is a desirable but not an absolutely essential feature although I do consider it a novel arrangement in combination with a bevel shaped sealing gasket.

Additional details relative to the cover arrangement aforedescribed will be set forth hereinafter in conjunction with the description or other modified forms of seals.

While the details of the sealing arrangement have been described in the foregoing with reference to a cover arrangement of just two pairs of cover sections, it is obvious that multiplication of the component parts to provide a batch cover arrangement of 6, 8, 10, 12 or more cover sections arranged in pairs and including inner pairs that necessarily must roll toward either end of the hatch openings for stowage is obviously within the framework of this invention since in conjunction with each pair of cover sections, I will provide a seal strip of gasket material transversely of the edge of one section for cooperation with an angled metal sealing bar on the adjacent section and along the opposite sides of each section will be a periphery gasket. Thus the same sealing relationship provided by complementary beveled surfaces will be utilized when the hatch opening is of a size and type as to require more than four cover sections.

The arrangement as heretofore described does not exclude in combination with the beveled peripheral sealing gasket of a seal extending transversely of the hatch opening and between adjacent cover sections that is not beveled as shown in, for example Figures 9 or 11, but comprises a rectangular or square block of gasket strip on one section and a horizontally extending complementary metal sealing bar on the other section to move toward and dig into the block of gasket material when the cover sections are in proper closed position.

Figure 23 illustrates a modification of the cover lifting structure and includes a roller 57ª which is carried by a standard 59 and is pressed against an inclined metal bar 60 carried by one cover section of a pair of adjacent cover sections regardless of whether they are pivotally interconnected like sections A and B or whether they are adjacent sections such as A and C. In the operation, lifting movement imparted to cover section denoted X in Figure 23, due to the cooperation of the under surface of inclined bar 60 and roller 57ª imparts a vertical component of movement to cover section X in its initial opening movement sufficient to break the horizontal seal. To permit proper dogging of cover section X the standard 59 is lowered. The standard 59 includes an inner support frame 61 which has three bolt holes therein and carries the roller at its upper end. Three aligned pairs of bolt openings are provided in the lower support standard 59. In the position shown, inner member 61 has been raised so that two bolts 62 and 63 are in the uppermost bolt holes. To dog the hatch cover, the bolts 62 and 63 are removed, the upper standard is lowered so that bolt 62 is reinserted in the position formely occupied by bolt 63 and bolt 63 is inserted to assume the dotted line position shown at the bottom of the standard which insures an effective lowering of roller 57ª. Obviously this structure can include an inner supporting member carrying the roller which is slotted and has bolt apertures at the opposite ends of the slot with one bolt being permanently secured through the slotted portion and in the upper position a locking bolt being secured through the uppermost pair of bolt apertures and in the lower position the bolt being removed from the upper apertures, the inner member slid downwardly by reason of the slotted connection with the first mentioned bolt and the removed bolt reinserted in the lowermost bolt apertures which would then align with the lower bolt on the lower standard 59.

Figure 14:
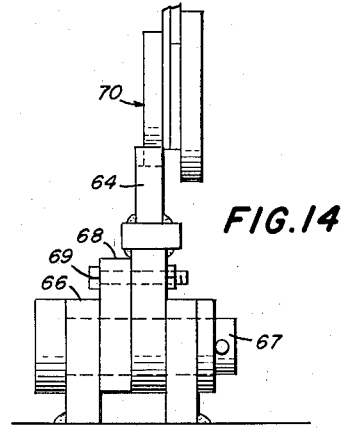

Since I do not want to be limited to the precise arrangement of pivoted cam member shown in Figure 8, Figures 13 to 16 illustrate modifications of this arrangement for cooperation with a double flange roller and which include means permitting lateral movement of the pivoted cam member when it is necessary to dog down the hatches. As shown in Figure 14 the support for the pivoted cam member 64 includes spaced apertured uprights 65, 66, welded to the deck. A pintle 67 passes through aligned bores therein after having threaded thereon the cam member 64 and the U-shaped shim 68 shown clearly in Figure 15. Aligned apertures are provided in the shim 68 and the pivoted cam member 64 for receiving a locking bolt 69. In the position shown in Figure 14 the cam is in position to cooperate with the smaller wheel 70 of a pair of wheels on a hatch cover section during the opening movement. In order to dog the cover it may be necessary to remove the pivoted cam member 64 from its position immediately underlying wheel 70. Therefore to move this cam member 64 laterally outwardly of the hatch coaming, bolt 69 is removed, the shim 68 is lifted off of pintle 67, cam member 64 is moved to the left in Figure 14, the shim reapplied to the right hand side of cam member 64, and the bolt 69 reinserted and secured. Obviously once a hatch cover is dogged tight it stays that way for a substantial length of time. Figure 13 being similar to Figure 8, it is utilized to show the mounting of the shim member 68. The cam contour in a modification of Figure 13 is interrupted whereas in Figure 16 the cam contour is continuous.

Figures 17 to 19 illustrate a further modification of this same principle in which double rollers 71 are provided on each of two adjacent hatch cover sections U and V, the double rollers on cover section U including roller elements 72, 73 carried by an arm 74 secured in position along the side edge of cover section U by a suitable bolt or welded connection. A similar arm 75 supports rollers 76 and 77. Subjacent these rollers are pivoted cam members. That form subjacent roller 73 and for cooperation therewith consists of a pivotal cam bar 78 swingable about a pintle 79 supported on vertical uprights one of which is illustrated at 80. This cam bar 78 can be lowered to lie along the deck as shown in dotted line position to the left in Figure 18. The cam bar underlying roller 77 is of slightly different construction in that it is supported by spaced similar uprights 81 which receive a pintle pin 82 and on which is pivoted the cam bar means including cam bar per se 83 and face plates 84, 85. Three sets of superposed bolt holes are provided in the face plates and in the cam bar and two sets of bolt holes are provided in cam bar 83. Bolt members 86 and 87 pass through the bolt holes in cam bar 83 to hold it in its uppermost position. For lowering to permit dogging, bolts 86 and 87 are removed, cam bar 83 slid downwardly, and bolts 86 and 87 reinserted in the two lowermost sets of bolt holes.

Figures 20 to 22 illustrate an arrangement somewhat similar to that shown in Figures 13 to 16. In Figure 21 is disclosed a cam bar 88 for cooperation with a roller 89. Bar 88 is mounted on a pintle 90 carried by spaced uprights 91. A shim as at 92 also is utilized in this arrangement. This shim has an aperture therein for receiving a locking bolt 93 which also cooperates with an aperture in the cam bar 88. Thus when the hatch cover is to be dogged, locking bolt 93 is removed, the shim is removed from its position shown in Figure 21, cam bar 88 is displaced laterally outwardly of the coaming to the dotted line position shown in Figure 21, the shim is reapplied to the opposite side of the cam bar 88, bolt 93 reinserted and the hatch cover dogged down.

In Figure 24 I have disclosed an important modification illustrating a joint between cover sections such as B and C in Figure 3. In this modification two adjacent cover sections M and N are each provided with a resilient seal strip 101, 102 respectively, secured in position by upper and lower retaining bars 103 and 104 respectively welded to the adjacent vertical walls of the sections. To provide the proper beveled sealing engagement, a vertically movable triangulated metallic sealing bar 105 is supported by a bracket arm 106 welded to the front wall of either cover section M or N, the arrangement shown is welded to the front of cover section N. The triangulated seal bar 105 is carried by a bolt 107 which is secured to the bar in rigid relationship and is threaded substantially throughout its length for respective cooperation with nuts 108, 109 bearing against opposite faces of the bracket arm 106. Obviously when nut 108 is turned bolt 107 and seal bar 105 moves in one direction and when nut 109 is turned the bolt and seal bar moves in the opposite direction. It being of course understood that the top plates of cover sections M and N are cut-out in the area immediately underlying the nut 108 and bracket arm 106 to permit manipulation of the nuts 108 and 109. It is further pointed out that there are a plurality of the metal seal bar raising and lowering means extending transversely of the joint between cover sections M and N with alternate bars 106 being secured to the respective sections N and M. In other words, every other bracket bar 106 is mounted to cover section N and the alternate ones mounted to cover section M. This triangulated metal seal bar 105 provides a very secure and effective seal between cover sections that are to move away from one another in a hatch opening operation.

Figure 25 discloses a modified form of peripheral seal in which on a cover section denoted at O the side wall thereof has an inturned flange 112 at the bottom thereof to which is secured the rubber seal strip 113 by suitable retaining plates such as 114 on one side and 115 on the other. The cooperating metal seal bar 116 is welded to the profile iron 117 that is secured to the vertical wall 118 of the coaming. This seal bar 116 slopes upwardly and outwardly from the coaming and the beveled end of the gasket strip 113 is inclined inwardly and downwardly from the outer peripheral edge of the cover section.

Figure 26 is a cross sectional view through a peripheral seal arrangement in which the gasket strip and metal seal bar are the reverse of that shown in Figure 25. In Figure 26 the profile iron 122 secured to the coaming wall 123 has supported thereon the metal seal bar 124 which extends from the upper edge of coaming wall 123 downwardly and outwardly for cooperation with the resilient gasket strip 125 having its beveled edge extending upwardly and inwardly. The resilient gasket strip 125 being suitably secured to the under surface of the cover section. In Figure 27 the seal arrangement is slightly altered in that the metal seal strip 126 is welded to the upper surface of the profile iron 127 intermediate the lateral edges thereof leaving a space between the inner wall 128 of the angled metal seal bar and the adjacent wall 129 of the coaming. The rubber or gasket strip 130 is beveled upwardly and inwardly as is the arrangement in Figure 26.

Figure 28 is a view showing a corner joint structure of the metal seal bar 116 shown in Figure 25. This corner seal bar is of course mitered at the joint and in the corner angle the bearing surface is rounded as at 131 to increase the reactive pressure on the gasket strip at the corner. It being obvious that the overlying gasket strip is likewise mitered.

Figure 29:
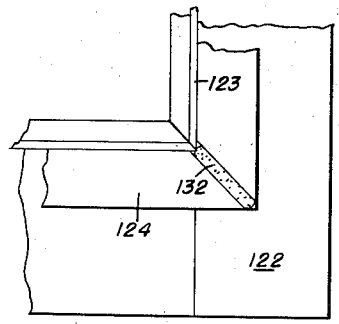

Figure 29 is a view similar to Figure 28 with the exception that it relates to the seal arrangement shown in Figure 26 and shows that at the corner the metal seal bar 124 is provided with an arcuate protuberance 132 to increase the reactive pressure on the overlying gasket strip 125 when the hatch cover is closed.

It is of course to be understood that the arrangement of Figures 28 and 29 are modifications and are desirable features but not absolutely essential. Thus in many instances the corner joints of the metal bars in the various sealing arrangements do not require the rounding or filling in to produce the reactive pressure against the gasket seal strip carried by the cover section.

Figure 30 illustrates a modification in which a flush type hatch cover section R is provided with a supporting bar 133 along the edge to house a rubber gasket strip 134 which is provided with a beveled edge extending downwardly and inwardly from the upper perimeter of the cover section R. On the adjacent hatch opening wall 135 is mounted the metal angle surface seal bar 136. Bar 136 being secured by welding for example. The proper beveled seal joint is provided between the metal bar 136 and the gasket strip 134 and underlying this joint is the supporting platform or rail 137 for the hatch cover supporting rollers.

Figure 31 illustrates a relationship similar to that of Figure 30 with the exception that the seal has been supplemented by an additional sealing means. In Figure 31 the rubber seal strip 138 seals against the metal seal bar 139 and projecting laterally from the wall of the hatch opening is a supporting bar 140 which carries a strip of gasket material 141. Projecting laterally from the side wall of the cover is a metal supporting strip 142 carrying a metal sealing bead 143 for cooperation with the resilient sealing strip 141 to provide a supplementary or second seal.

Figure 32 illustrates a modification of the arrangement shown in Figure 25 in which in addition to the seal provided between the metal seal strip 144 and the gasket strip 145 and another gasket strip 146 is supported on the profile iron 147 and carried on the under surface of the cover flange is a sealing bar including a sealing bead and a supporting rib 148. This sealing bead cooperated with the sealing gasket strip 146. Figure 33 is similar to the arrangement of Figure 32 except that the sealing bead and its supporting rib 149 are welded to the profile iron 150 for cooperation with a gasket strip 151 supported on the under surface of the bottom cover flange 152.

Figure 34 illustrates a double seal arrangement for a joint of the type disclosed in Figures 9 and 11. In Figure 34 the rubber seal strip 153 cooperates with the angled metal seal bar 154. Underneath one cover section is mounted a supporting bar 155 having a channel member 156 carried at the end thereof and in which channel member is mounted a strip of gasket material 157. On the under surface of the opposite and adjacent cover section is a supporting bar 158 with a sealing bead at the end thereof for cooperation with the gasket strip 157. It is thus clear that in this and the immediately aforedescribed arrangements, which are ideally suitable for refrigerated holds, a double seal is provided.

Figure 35 discloses a structural modification of the cover in which the hatch coaming 159 has the usual profile rail 160 on the outer side thereof and the angled metal seal bar 161 extends from the upper edge of the coaming downwardly and outwardly into its juncture with the profile rail 160. The transverse dimensions of a cover section P are reduced in this modification in that the bottom flange of the cover section 162 extends laterally outwardly of the side wall 163 of the cover as compared with the opposite arrangement in the other forms previously described. This permits the total transverse dimensions of the sheet metal used to form the top of the cover section P of being reduced to at least to the extent of the projection of flange 162. Of course strengthening ribs 164 are provided along the periphery of the cover section and which ribs are notched for the engagement of suitable dogging bolts 165 when the cover is to be dogged down. The lateral flange 162 has on its under surface the depending securing strips 166 and 167 within which is secured the rubber seal strip 168 forming the peripheral seal. Additionally the transverse seal between cover section P and an adjacent cover section is facilitated by the mounting of an L-shaped metal bar 169 on the face of the end wall 170 of the cover section with the small leg of the L overlying the upper edge of the transverse gasket seal strip 171 in a manner similar to the arrangement shown in either Figures 34 or 9. Obviously the cover section that is to cooperate with cover section P is provided with a transversely extending metal seal bar having an angled face and which metal seal bar is similar to seal bar 17 or 154.

Figure 36 discloses a modification of a peripheral seal in which the metal seal bar 172 is in effect shortened in its lateral projection and turned back to merge with the profile rail 173 adjacent the wall of the coaming. It is further within the concept of this modification to weld the metal seal bar 172 at one end of the upper edge of the coaming and at its lower end directly to the outer wall of the coaming. This is particularly necessary where the profile supporting rail must be disposed at a lower level along the coaming wall. Further the gasket strip is held in place by a removable angle piece 173ª bolted to depending strip 166ª.

In Figure 37 the beveled gasket strip 174 cooperates with the angled metal seal bar 175 to provide one seal and an additional gasket strip 176 is secured to the under surface of the cover for cooperation with the upper edge of the coaming.

In Figure 38 I have disclosed a double seal arrangement especially suitable between two adjacent cover sections regardless of whether they are pivotally interconnected or constitute end sections of adjacent groups of sections. In this modification the rubber gasket strip 177 seals against the angled metal seal bar 178 to form the first seal. A further rubber gasket strip 179 is carried by the transverse wall of one cover section for engagement by a metal sealing bar 180 carried in the specific form illustrated by the upper housing strip 181 that partially encompasses the gasket strip 177. It is believed obvious that in connection with the arrangement of Figure 38, the supplementary gasket strip similar to 179 can be carried by the upper surface of the housing strip 181 while the angled shaped seal bar akin to that denoted at 180 can be carried by the wall of the adjacent cover section. Or in other words, the reverse arrangement of the secondary seal shown in Figure 38 is contemplated by this invention.

It is therefore clear that the present invention provides a unique and novel sealing principle for hatch covers embodying the cooperative combination between a sealing gasket having an angled sealing edge carried by the cover and a complementary angled metal seal bar carried by the coaming. The angled relationship being such that when the cover is closed the sealing gasket tends to adjust itself in proper sealing relationship regardless of any warpage factors set up in either the cover or the coaming edge. Additionally it is easier to disrupt the horizontal seal joint where the engaging surfaces are angled as compared with conventional seals where the engaging surface between the seal strip and the sealing bar or means on the coaming is horizontal.

As an adjunct I have further provided stiffening ribs depending from the under surface of cover sections and engageable with the upper edge of the coaming when the cover is dogged down to bear some of the weight of the cover so that the total weight of the cover is not borne by the gasket strip.

Furthermore this invention provides in conjunction with the opening of water-tight covers, means automatically operable upon the initiation of lifting movement to disrupt the horizontal seal thus eliminating any separate jacking of the covers preparatory to opening the same. I have further provided a safety pivot bearing or hinge at the opposite ends of the hatch cover which permit the complete disassociation of the covers from the hatch if this is desired. The invention discloses various peripheral seal arrangements and further includes an adequate seal joint between adjacent cover sections that move in opposite directions in a cover opening operation.

I have further embodied means at the corners of the metal seal bars on the peripheral seals to build up these corners to impart additional compressive force to the overlying gasket strip to enhance the effectiveness of the joint at the covers.

Additionally I have disclosed a beveled surface seal for flush type covers and various arrangements providing a double seal.

An important adjunct of this invention includes the fact that the angled seal bar sloping downwardly and outwardly from the upper surface of the coaming to the profile rail eliminates the necessity of providing drainage means between the sealing bar and the coaming and insures the water-tightness of the joint. Obviously drain holes are provided in the opposite side bars of the hatch cover sections at an area on a level with the joint between the transversely extending gasket strip and the seal bar immediately above the uppermost point of contact of the transverse gasket strip with the angled seal bar. Furthermore the invention discloses various arrangements for automatically breaking the horizontal seal between the peripheral gasket strip carried by the cover section and the metal sealing bar carried by the coaming which incorporate the cooperation between a roller carried by the cover section initially lifted with a pivoted cam bar or lever arm supported exteriorly of the coaming. Obviously with the initial pull upwardly on the cover section to be moved, the roller resting on the cam bar causes the cam bar to pivot which in turn imparts an initial vertical component of movement to the cover supplementing the pivoting action of the cover, which initial vertical movement disrupts the horizontal seal of the first cover section to be moved.

In conjunction with the seal between adjacent cover sections and the periphery of the coaming, I want to particularly point out that along the sides of each cover section I have provided a beveled surface gasket strip. The joint between adjacent cover sections along the sides of the coaming is beveled in the longitudinal direction of the hatch opening. Immediately overlying this sealing relationship of the peripheral seal is the seal that extends transversely between adjacent cover sections. As clearly indicated in the drawings, between adjacent cover sections is a rigid metal angled sealing bar on one section and a bevel surfaced gasket strip on the other section at the opposite side edges of the peripheral joint. As shown in Figure 11, the rubber gasket strip 96 bears on the top of the periphery gasket 16ª so that there is a rubber to rubber seal at the opposite sides of the coaming immediately underlying the joint between adjacent cover sections. In this connection the supporting bar underlying the rubber strip 16 that extends transversely of the hatch opening, such as 30 in Figure 12, is discontinued before one reaches the side edge of the hatch and at the peripheral or side edge of the hatch a bottom supporting bar 30ª is utilized which overlies or is above the top surface of the peripheral sealing gasket 16ª. Thus as shown in Figure 11 there is a rubber to rubber horizontal seal between gasket strip 16 and gasket strip 16ª in addition to the seal between gasket strip 16 and metal bar 18 and in addition to the seal between gasket strip 16ª and metal bar 18 in Figure 12.

It will also be evident that various other forms embodying substitutions, eliminations, additions and combinations may be resorted to without departing from the broad spirit and scope of the appended claims and hence I do not wish to limit myself in all respects to the exact and specific disclosures of the selected examples of hatch cover arrangements.

Therefore consistent with the preceding paragraph, a desirable modification of the present invention includes an arrangement as shown in Figure 39 in which the sealing surface of the rubber gasket strip or strips 49ᶜ is arcuate in cross-section, that is bulged outwardly toward the cooperating sealing bar 49ᵇ. This provides an arrangement which, when the cover is closed, compresses the sealing surface of the rubber gasket into a flat sealing engagement with the cooperating sealing bar.

Additionally in instances where it is desired to insure the proper closing of folding hatch covers, I contemplate as a modification the provision of guide strips depending from the under surface of the cover sections at a position inwardly of the respective side edges thereof and which guide strips slant downwardly and inwardly toward the axis of the hatch opening and are disposed a distance inwardly of the outer edge of the hatch cover such that in closing the cover the guide strips on the opposite side edges slidably engage the round bead or any other bead provided at the inner upper peripheral edge of the coaming to insure that the gasket strip exteriorly of the coaming is properly correlated with its cooperating metal seal bar, see Figure 26 as an example.

What I claim is:

1. In a ship's hatch cover arrangement, vertical wall means delimiting a hatch opening, at least two cover sections cooperable with said opening, means mounting the sections for movement relative to the opening, each section including vertical side and end walls, a metallic sealing strip means carried by the wall means that delimit the opening including an upper planar sealing surface extending laterally of said wall means and disposed at an angle to the axis of the opening, a cooperable, compressible gasket strip means carried by the side and end walls of the sections that are respectively adjacent the said vertical wall means including a laterally exposed sealing surface inclined at approximately the same angle as the planar sealing surface and cooperable therewith to provide a face to face sealing engagement of substantial extent in a direction transverse to the longitudinal axis of the strip means, the gasket strip means extending along the sides of the respective sections including portions projecting beyond the end walls of the respective sections that are adjacent one another and a transverse seal between the respective sections including a metallic strip means carried by the end wall of one of said sections and a cooperable gasket strip means carried by the adjacent end wall of the other section, said last mentioned metallic and gasket strip means including opposite end portions contacting the portions of the strip means along the sides of the sections that extend beyond said adjacent end walls whereby when the sections are in closing relation the gasket strip means along the sides of the sections are in sealing engagement with one another and with the planar sealing surface and the metal strip means and gasket strip means extending transversely of the opening are in sealing engagement with one another and with said projecting portions of the gasket strip means along the sides of the sections.

2. In a ship's hatch cover arrangement, vertical wall means delimiting a hatch opening, at least two cover sections cooperable with said opening, means mounting the sections for movement relative to the opening, each section including vertical side and end walls, a metallic sealing strip means carried by the wall means that delimit the opening including an upper planar sealing surface extending laterally of said wall means and disposed at an angle to the axis of the opening and slanting downwardly and outwardly from the opening, a cooperable, compressible gasket strip means carried by the side and end walls of the sections that are respectively adjacent the said vertical wall means including a laterally exposed sealing surface inclined at approximately the same angle as the planar sealig surface and cooperable therewith to provide a face to face sealing engagement of substantial extent in a direction transverse to the longitudinal axis of the strip means, the gasket strip means extending along the sides of the respective sections including portions projecting beyond the end walls of the respective sections that are adjacent one another and a transverse seal between the respective sections including a metallic strip means carried by the end wall of one of said sections and a cooperable gasket strip means carried by the adjacent end wall of the other section, said last mentioned metallic and gasket strip means including opposite end portions contacting the portions of the strip means along the sides of the sections that extend beyond said adjacent end walls whereby when the sections are in closing relation the gasket strip means along the sides of the sections are in sealing engagement with one another and with the planar sealing surface and the metal strip means and gasket strip means extending transversely of the opening are in sealing engagement with one another and with said projecting portions of the gasket strip means along the sides of the sections.

3. A ship's hatch cover arrangement as claimed in claim 1 in which the projecting portions of the compressible gasket strip means that extend beyond the end walls of the respective sections that are adjacent one another have oppositely inclined end faces which abut one another in mutually overlapping relation when the sections are closed.

4. In a ship's hatch cover arrangement, vertical wall means delimiting a hatch opening, at least one cover section, means mounting the section for movement relative to the opening, said section including vertical wall means, a seal between the mutually adjacent wall means of the section and said first mentioned wall means comprising a rigid sealing means carried by and extending around said first mentioned wall means and including an upper planer surface extending laterally of said first mentioned wall means and disposed at an angle to the axis of the opening, a cooperable, compressible gasket strip means carried by the section for sealing engagement with said surface, said gasket strip means including a laterally exposed surface inclined at approximately the same angle as said planar sealing surface and engageable therewith to provide a face to face sealing arrangement having a substantial extent of contact between the sealing surface and the strip means in a direction transverse to the longitudinal axis of the strip means, said rigid sealing member being carried exteriorly of the wall means and delimits the opening and said upper planar sealing surface slanting downwardly and outwardly from the opening.

5. A ship's hatch cover arrangement comprising vertical side and end walls delimiting a hatch opening, a plurality of cover sections for cooperation with the opening, means pivotally interconnecting the sections in pairs, mounting means mounting the pairs of sections for at least partial movement in the plane of the opening, each section including vertical side and end walls, a rigid sealing means carried by the side and end walls that delimit the section, cooperable, compressible gasket strip means carried by the cover sections and overlying said rigid sealing means when the covers are in closed position, said gasket strip means including portions extending beyond the adjacent end walls of adjacent sections, said portions being in mutual sealing engagement when the sections are closed, a transverse seal between adjacent cover sections including cooperable gasket strip means and metallic strip means carried by the respectively adjacent end walls of the sections, the gasket strip means and the metallic strip means of the respective transverse seals including opposite end portions in engagement with the portions of the compressible gasket strip means that project beyond the end walls of the respective sections that are adjacent one another, said mounting means including means at the ends of the opening pivotally connecting one section of the adjacent pair of sections for movement about a horizontal axis and lift force applying means carried in part by the other section of said adjacent pairs and in part exteriorly of the sides of the opening for automatically imparting a lift force to said other section of the pair adjacent the ends of the opening upon initiation of pivotal movement of said one section of each pair in a hatch opening direction thus to break the seal joint between the respective rigid sealing means and gasket strip means.

6. A ship's hatch cover arrangement as claimed in claim 5 in which the means pivotally connecting one section of the pairs of sections adjacent the ends of the opening for movement about a horizontal axis comprises pivot means mounted exteriorly of the ends of the opening, said pivot means comprising at least one two-part bearing member mounted exteriorly of the ends of the opening, means pivotally connecting the parts of the bearing member together, a pintle carried by the said one section of each pair that is adjacent an end of the opening and engageable between the parts of the bearing member and means removably coupling said two parts together so as to permit disassociation of the pintle from the bearing members.

7. A ship's hatch cover arrangement as claimed in claim 1 and further including additional sealing means between the wall means delimiting the opening and the overlying wall means of the cover sections.

8. A water-tight hatch cover as defined in and by claim 5, in which the part of the lift force applying means carried by said other section of each pair is a roller and the part of the lift force applying means carried exteriorly of the opening is a pivoted lever arm cooperably engaging beneath said roller.

9. A water-tight hatch cover as defined in and by claim 8, including adjustable means mounting the lever arm for movement laterally of the opening so as to permit displacement of the lever arm to a position out of alignment with the roller to permit lowering of the roller when the cover is tightened.

10. A water-tight hatch cover comprising in combination wall means delimiting a hatch opening having opposite sides and ends, a plurality of groups of cover sections cooperable therewith and including vertical side and end wall means, the said wall means of the sections lying in planes displaced laterally of the planes containing the side wall means delimiting the opening, a peripheral rigid sealing bar means and a cooperable sealing gasket means respectively carried by the wall means of said sections and the wall means delimiting the hatch opening for cooperative sealing engagement when the sections are closed, said groups of sections including at least one pair of pivotally interconnected sections, pivot means mounted at the ends of the opening and pivotally connecting the section of each group that is adjacent an end of the opening for movement about a horizontal axis, and lift force applying means cooperatively associated with the one section of each pair of sections for automatically imparting a lift force to said other section of each pair on initiation of pivotal movement in a hatch opening direction to break the seal joint between the said other section of each pair and the sealing bar.

11. A water-tight hatch cover as defined in and by claim 10, in which the said pivot means pivotally connecting the sections adjacent the ends of the opening for movement about a horizontal axis comprises at least one two part bearing member mounted exteriorly of the ends of the opening, means pivotally connecting the parts of the bearing member together, a pintle carried by the sections and engageable between the parts of the bearing member, and means removably coupling said two parts together so as to permit disassociation of said pintle from the bearing member.

12. In a water-tight hatch cover as defined in and by claim 7, and additional transverse sealing means between adjacent cover sections including supplementary transverse gasket means and a transverse sealing bar cooperable therewith.

13. A water tight hatch cover comprising in combination with vertical wall means delimiting a hatch opening, a plurality of cover sections, means mounting said sections for movement relative to the opening, said sections including vertical wall means lying in planes spaced laterally of the planes containing the first mentioned wall means, a peripheral seal between the wall means comprising a rigid sealing member carried by one of said wall means and including an upper planar sealing surface extending laterally thereof and disposed at an angle to the axis of the opening, a cooperable compressible gasket strip means carried by the other of said wall means that overlie said first wall means, said gasket strip means, including a sealing surface disposed at approximately the same angle and engageable with the sealing surface of the rigid sealing member to provide a face to face sealing arrangement, transverse sealing means between adjacent sections comprising a transverse sealing bar carried by one section and a transverse gasket strip carried by the other section, and said first mentioned sealing surface slanting downwardly and outwardly from said opening.

14. A water tight hatch cover comprising in combination with vertical wall means delimiting a hatch opening, a plurality of cover sections, means mounting said sections for movement relative to the opening, said sections including vertical wall means lying in planes spaced laterally of the planes containing the first mentioned wall means, a peripheral seal between the wall means comprising a rigid sealing member carried by one of said wall means and including an upper planar sealing surface extending laterally thereof and disposed at an angle to the axis of the opening, a cooperable compressible gasket strip means carried by the other of said wall means that overlie said first wall means, said gasket strip means, including a sealing surface disposed at approximately the same angle and engageable with the sealing surface of the rigid sealing member to provide a face to face sealing arrangement, transverse sealing means between adjacent sections comprising a transverse sealing bar carried by one section and a transverse gasket strip carried by the other section, and said first mentioned sealing surface slanting downwardly and inwardly toward the axis of said opening.

15. In a ship's hatch cover arrangement, vertical wall means delimiting a hatch opening, a plurality of cover sections cooperable with the opening, means mounting the sections for movement relative to the opening, said sections each including vertical wall means, a seal between the mutually adjacent wall means of the sections and said first-mentioned wall means comprising a rigid sealing means carried by and extending around said first-mentioned wall means and including an upper planar surface extending laterally of said first-mentioned wall means and disposed at an angle to the axis of the opening, a cooperable, compressible gasket strip means carried by the section for sealing engagement with said surface, said gasket strip means including a laterally exposed surface inclined at approximately the same angle as said planar sealing surface and engageable therewith to provide a face to face sealing arrangement having a substantial extent of contact between the sealing surface and the strip means in a direction transverse to the longitudinal axis of the strip means, said peripheral rigid sealing member being carried by the wall means delimiting the hatch opening and the gasket strip means comprising plural strips carried by each cover section, said plural strips including strips extending along the sides of each section and having portions projecting beyond the wall means of the respective sections that are adjacent one another, the adjacent ends of the projecting portions of the strips extending along the sides of adjacent sections being beveled and in cooperative sealing engagement.

16. A water-tight hatch cover as defined in and by claim 15, and further including a sealing means extending transversely of the opening and between adjacent cover sections, said last mentioned sealing means comprising a gasket strip carried by one section and a sealing bar carried by the other section, said last mentioned gasket strip including portions overlying and in sealing engagement with at least one of the strips extending along one of the sides of the sections.

17. In a water tight hatch cover arrangement for vessels and for cooperation with vertical side and end walls delimiting a hatch opening, a plurality of cover sections, means mounting the cover sections for movement relative to the opening to open and close the same and said mounting means including means permitting at least partial movement in the plane of the opening, each cover section including vertical side and end walls, the side walls of all the sections and the end walls of the sections adjacent each end of the opening being displaced laterally of the side and end walls that delimit the opening, a peripheral seal for the opening comprising a sealing bar means carried by the first mentioned side and end walls and including an upper planar sealing surface extending laterally of the said first mentioned walls at an angle to the axis of the opening and slanting downwardly and outwardly from the opening, a cooperable compressible gasket strip means carried by the side walls of each cover section and the end walls of the sections adjacent the ends of the opening and overlying said upper sealing surface in closed position of the sections, said strip means including a sealing surface extending laterally of the wall means of the cover sections in uncompressed condition at approximately the same angle to the axis of the opening as the said upper sealing surface of the sealing bar and said sealing surface of the strip means having an extent such as to be compressibly engageable with a substantial area of the upper sealing surface of the sealing bar when the covers are closed so as to provide a face to face peripheral seal between the surfaces.

18. In a water tight hatch cover arrangement as claimed in claim 17, in which the sealing bar is carried exteriorly of the side and end walls that delimit the opening.

19. In a water tight hatch cover arrangement as claimed in claim 17, and further including a transverse seal between the adjacent end walls of adjacent sections including a rigid sealing bar means carried by one of the adjacent walls and a gasket strip means carried by the other of the adjacent walls, the gasket strip means carried by the side walls of each section including portions projecting beyond the end walls of the respective sections that are adjacent one another and the rigid sealing bar means and gasket strip means of the transverse seals including opposite end portions in engagement with the projecting portions of the gasket strip means carried along the side walls of the sections when the sections are in closed relation.

20. In a water tight hatch cover arrangement as claimed in claim 19, in which the transverse seal between adjacent sections is in a plane above the peripheral seal, and the ends of the gasket strip means of the transverse seals being in overlying sealing engagement with the gasket strip means of the peripheral seal.

21. In a water tight hatch cover arrangement as claimed in claim 20, in which the projecting portions of the gasket strip means carried by the sides of each cover section have beveled edges in cooperative overlapping sealing relation with one another at the juncture between adjacent sections.

22. In a ship's hatch cover arrangement, vertical wall means delimiting a hatch opening, at least two cover sections for cooperation with the opening, means mounting the sections for movement relative to the opening, a rigid metallic sealing means carried by the said wall means, each section having opposite side and end walls, compressible gasket stripping means carried by the walls of the sections that overlie the wall means delimiting the opening, said compressible gasket stripping including projecting portions extending beyond the end walls of the respective sections that are adjacent to one another, said projecting portions having end and under surfaces adapted for mutual sealing relation with each other and with the rigid sealing means respectively when the sections are closed, a transverse seal between the respective sections including extending along the end wall of one section that is adjacent an end wall of the other section a rigid metallic sealing means, extending along the adjacent end wall of the other section a compressible gasket stripping means, the last mentioned rigid metallic sealing means and compressible gasket stripping means including opposite end portions having surfaces in respective engagement with the projecting portions of the gasket stripping along the sides of the respective sections whereby when the sections are closed the transversely extending rigid sealing means and gasket stripping means are in sealing relation with each other and with the said projecting portions of the first mentioned gasket stripping means.

References Cited in the file of this patent

UNITED STATES PATENTS

| | | |
|---|---|---|
| 736,357 | Brousseau | Aug. 18, 1903 |
| 1,018,777 | Potuin | Feb. 27, 1912 |
| 1,597,166 | Meyercord | Aug. 24, 1926 |
| 2,141,481 | Mattingley | Dec. 27, 1938 |
| 2,197,824 | Young | Apr. 23, 1940 |
| 2,256,087 | Hay | Sept. 16, 1941 |
| 2,360,276 | Redmond | Oct. 10, 1944 |
| 2,373,355 | Temple | Apr. 10, 1945 |
| 2,491,261 | Greer et al. | Dec. 13, 1949 |
| 2,608,728 | Montgomery | Sept. 2, 1952 |
| 2,627,835 | Mege | Feb. 10, 1953 |
| 2,633,613 | MacGregor | Apr. 7, 1953 |
| 2,641,214 | MacGregor | June 9, 1953 |
| 2,663,268 | Ahnell | Dec. 22, 1953 |
| 2,664,947 | Aarvold | Jan. 5, 1954 |

FOREIGN PATENTS

| | | |
|---|---|---|
| 611,848 | Great Britain | Nov. 4, 1948 |
| 651,343 | Great Britian | Mar. 14, 1951 |
| 750,871 | Germany | May 12, 1943 |
| 812,648 | Germany | Sept. 3, 1951 |
| 984,154 | France | Feb. 21, 1951 |